(12) United States Patent
Chang et al.

(10) Patent No.: US 9,158,176 B2
(45) Date of Patent: Oct. 13, 2015

(54) OPTICAL SYSTEM AND OPTICAL FILTERING METHOD

(71) Applicant: UNIVERSITY OF CENTRAL FLORIDA RESEARCH FOUNDATION, INC., Orlando, FL (US)

(72) Inventors: Zenghu Chang, Oviedo, FL (US); Qi Zhang, Orlando, FL (US); Kun Zhao, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 88 days.

(21) Appl. No.: 14/154,443

(22) Filed: Jan. 14, 2014

(65) Prior Publication Data

US 2015/0198860 A1    Jul. 16, 2015

(51) Int. Cl.
*G02F 1/35* (2006.01)
*H01J 35/24* (2006.01)
*H05G 2/00* (2006.01)

(52) U.S. Cl.
CPC ............... *G02F 1/353* (2013.01); *H01J 35/24* (2013.01); *H05G 2/00* (2013.01); *H01J 2235/06* (2013.01); *H01J 2235/08* (2013.01)

(58) Field of Classification Search
USPC .................................................. 250/504 R
See application file for complete search history.

(56) References Cited

U.S. PATENT DOCUMENTS

2011/0180696 A1 * 7/2011 Gessner et al. ............... 250/234

OTHER PUBLICATIONS

Cao et al., Soft x-ray low-pass filter with a square-pore microchannel plate, May 1, 2013 / vol. 38, No. 9 / Optics Letters, 1509-1511, 2013 Optical Society of America.
Falcone et. al., Dichroic beam splitter for extreme-ultraviolet and visible radiation, Jan. 1983 / vol. 8, No. 1 / Optics Letters, 21-23, 1983, Optical Society of America.
Peatross et. al., High-order harmonic generation with an annular laser beam, Jul. 1, 1994 / vol. 19, No. 13 / Optics Letters, 1994 Optical Society of America; 942-944.
Takahashi et al., Generation of Strong Optical Field in Soft X-Ray Region by Using High-Order Harmonics, Nov./Dec. 2004, vol. 10, No. 6, IEEE Journal of Selected Topics in Quantum Electronics; 1315-1328.

* cited by examiner

*Primary Examiner* — Kiet T Nguyen
(74) *Attorney, Agent, or Firm* — William Greener; Bond, Schoeneck & King, PLLC (57) ABSTRACT

An optical filtering method that utilizes a Microchannel Plate (MCP) and an optical system that utilizes the optical filtering method. As an example, a XUV/SXR generation system that includes a MCP as a dispersionless, broadband IR pump filter.

29 Claims, 6 Drawing Sheets

OPTICAL SYSTEM AND OPTICAL FILTERING METHOD

GOVERNMENT SUPPORT

Certain embodiments and aspects of the disclosed invention were made with government support under Award No. 1068604 from the National Science Foundation (NSF), agreement No. W911NF-12-1-0456 from the Army Research Organization (ARO), and contract No. W31P4Q1310017 from DARPA. The United States government has rights in the invention.

RELATED APPLICATION DATA

N/A.

TECHNICAL FIELD

Embodiments of the present invention relate generally to the field of optics and more particularly to an optical filtering method and an optical system that utilizes the optical filtering method.

BACKGROUND

Since the first experiment demonstrating attosecond (as) pulses from High-order Harmonic Generation (HHG) in 2001, the evolution of time resolved research of ultrafast phenomena with the precision of attosecond time scale has greatly impacted scientific understanding of electron dynamic in atoms, molecules and condensed matters. When an intense, few-cycle laser pulse (driver, pump, excitation), usually with the Infrared (IR) spectra (including Near-IR (NIR) and Mid-IR (MIR)), is tightly focused on a gaseous or other suitable target, a bright and coherent laser source in the extreme ultraviolet (XUV) or soft x-ray (SXR) spectra can be generated. This generated XUV/SXR beam can have a broad bandwidth that is several to hundreds of orders of the driving pulse frequency, and a pulse duration on the order of attoseconds (as), representing some of the shortest pulse durations ever created. The generated XUV/SXR beam, however, co-propagates with the residual driving (pump, excitation) pulse.

The practical and effective use of this ultra-short XUV/SXR beam requires the separation of the co-propagating 'signal' (XUV/SXR) beam and residual 'pump' beam, in large part due to the low ($10^{-5}$ to $10^{-6}$) efficiency of the HHG process that generates the signal beam. This co-propagating beam separation presents a considerable challenge, for example, when a several hundred millijoule (mJ) pump beam is used to generate a high flux signal or when a Mid-IR laser is used for extreme broadband signal spectra generation.

Several exemplary techniques and related apparatus are known, such as thin film metallic filters, the use of annular pump beams, dichroic beam splitters, a Si/SiC plate set at Brewster angle, and a grating beam separator. Their various shortcomings are explained below.

The use of a thin film (hundreds of nanometer thickness) of metallic filter is a straightforward way to block the pump beam while transmitting the XUV/SXR signal beam. However, certain types of metallic filter are transparent only over a certain spectral range. For example, a Molybdenum (Mo) filter only transmits the XUV/SXR beam above 80 electron volts (eV) photon energy. As such, there is an absence of thin film metallic filters that are transparent in a different, desired spectral range. For instance, many pump-probe experiments studying molecular dynamics involve using a photon energy around 10-20 eV; however, no single thin film metallic filter can cover this energy range. Thin film metallic filters also are extremely fragile and some types, such as Zirconium, are very susceptible to strong pump lasers.

The use of annular pump beams, while not susceptible to damage, is very inefficient because a significant among of pump energy is eliminated.

Another approach is to use a dichroic mirror coated with multiple layers of specially chosen materials for best reflectivity. However, the coating design and manufacture is complicated and the high reflectivity can only be obtained within a limited energy range.

A Si/SiC plate at the Brewster angle has been used to separate XUV and IR wavelengths. While this approach provides a high damage threshold and reflectivity higher than 50%, the achievable high reflectivity can only extend to ~60-70 eV, and more importantly, this method does not work for a Mid-IR pump laser.

Most recently, gratings have been proposed for use as the beam separator. The system can be designed for any wavelength, and the damage threshold is high due to the grazing incident angle on the grating. However, besides involving a complicated system and exhibiting overall low efficiency, different wavelength components of the output XUV/SXR signal beam will be spatially separated. Therefore the capability to spatially overlap all the wavelength components for broadband application remains unproven.

In view of the aforementioned problems, challenges and shortcomings in the art, the inventors have recognized the benefits and advantages that would be provided by solutions embodied in systems, components, and methods for, and utilizing, optical filtering between two different wavelengths or spectra such as, but not necessarily limited to, an IR pump beam and an XUV/SXR signal beam. The benefits and advantages are especially acknowledged for systems, components, and methods for, and utilizing, optical filtering between an IR pump beam having an energy equal to or greater than about 10 mJ and the generated signal beam over an uninterrupted photon energy range from 10 eV to higher than 100 eV, and from 10 eV to higher than 200 eV.

SUMMARY

Definitions

Microchannel Plate (MCP): As used herein, the term 'Microchannel Plate' or 'MCP' refers to a commercially available microchannel plate that is typically a slab made from highly resistive material of typically less than one (1) mm thickness (e.g., 200-400 micrometers) with a regular array of millions of small diameter tubes or slots (microchannels) leading from one face to the opposite, densely distributed over the whole surface. The microchannels are typically approximately 10 micrometers in diameter (e.g., 6 micrometer in high resolution MCPs) and are spaced apart by approximately 15 micrometers. The microchannels are parallel to each other and may enter the plate at a small angle to the surface (~8° from normal).

About and substantially: As may be used herein for purposes of the present disclosure, the term 'about' means the amount of the specified quantity plus/minus a fractional amount thereof that a person skilled in the art would recognize as typical and reasonable for that particular quantity or measurement; e.g., "wherein the optical excitation beam wavelength, $\lambda_p$, is in the range between 'about 400 nanometers (nm) to 5 micrometers (μm)'" could mean 400±15 nm, more or less. Likewise, the term 'substantially' means as close to or similar to the specified term being modified as a person skilled in the art would recognize as typical and reasonable; for e.g., within typical manufacturing and/or assembly tolerances, as opposed to being intentionally different by design and implementation.

Suitable: As may be used herein for purposes of the present disclosure, the term 'suitable' means having the qualities that are right, needed, or appropriate for something, especially as a person skilled in the art would understand; e.g., 'providing a suitable target' could mean providing a target known to be capable of generating a signal beam of wavelength $\lambda_s$ by irradiating the target with an optical excitation beam of wavelength $\lambda_p$, where $\lambda_p > \lambda_s$.

Attosecond, femtosecond pulses: As may be used herein for purposes of the present disclosure, the terms 'attosecond,' 'femtosecond,' etc. include any value of said named parameter in the range greater than zero and less than 1000.

Microchannel Plate (MCP): The formation of microchannel plates and the process of making the same is well known in the art. Examples of such art are disclosed in U.S. Pat. Nos. 4,853,020, 4,737,013, 4,629,486 and many others. MCPs can be purchased from companies such as, e.g., Photonis (Frisco, Tex.) and Hamamatsu. An exemplary MCP used by the inventors to obtain the exemplary results had pore channel diameter of 8 um and a thickness to diameter ratio (L/D ratio) of 40:1 (TecTra GmbH, MCP-25-40-d). The opening area ratio was 58% to 60%, limiting the maximum value of the transmission.

An embodiment of the invention is a method for optical filtering. The method includes the steps of co-propagating two optical beams of wavelengths $\lambda_1$, $\lambda_2$, respectively, wherein $\lambda_2 < \lambda_1$; providing a microchannel plate (MCP) in a path of the co-propagating optical beams, wherein the MPC comprises a plurality of apertures each having a diameter greater than $\lambda_2$; and transmitting a greater portion of the $\lambda_2$ beam than the $\lambda_1$ beam through the MCP. The embodied method may be characterized by the following illustrative, exemplary, non-limiting aspects or steps:
  wherein $\lambda_1$ is in the range from about 400 nanometers (nm) to 5 micrometers ($\mu$m) having a pulse energy equal to or greater than 10 millijoules (mJ), and the $\lambda_2$ beam is in the XUV and/or the SXR spectra and has a photon energy equal to or greater than 10 electron volts (eV);
    wherein the generated XUV and/or SXR signal beam has a photon energy equal to or greater than 100 eV;
      wherein the generated XUV and/or SXR signal beam has a photon energy equal to or greater than 200 eV;
  wherein each of the plurality of apertures each has a diameter equal to or greater than $10\lambda_2$;
  wherein each of the plurality of apertures each has a diameter equal to or less than $\lambda_1$;
  further comprising establishing a wavelength transmission cut-off of the MCP by a given diameter of each of a plurality of microchannels in the MCP.

An embodiment of the invention is a method for optical filtering. The method includes the steps of providing a suitable target; irradiating the target with an optical excitation beam of wavelength $\lambda_p$, wherein a residual optical excitation beam after irradiation of the target has a propagation path optically downstream of the target after said irradiation; generating a signal beam of wavelength $\lambda_s$, wherein the signal beam has a propagation path optically downstream of the target, further wherein the residual optical excitation beam propagation path and the signal beam propagation path are co-propagating paths over a given distance; providing a Microchannel Plate (MCP) in the co-propagating optical paths and suppressing at least a portion of the residual optical excitation beam via the MCP while transmitting the optical signal beam through the MCP. The embodied method may be characterized by the following illustrative, exemplary, non-limiting aspects or steps:
  wherein the target is one of a gaseous, a liquid, and a solid target material;
  comprising generating the signal beam via High Harmonic Generation (HHG) in the target;
  wherein the optical excitation beam wavelength, $\lambda_p$, is in the range between about 400 nanometers (nm) to 5 micrometers ($\mu$m) and has a pulse energy equal to or greater than 10 millijoules (mJ);
  wherein the optical excitation beam comprises femtosecond (fs) laser pulses;
  wherein the optical signal beam wavelength, $\lambda_s$, is in the extreme ultraviolet (XUV) and/or the soft x-ray (SXR) spectra, and is characterized by a photon energy equal to or greater than 10 eV;
    wherein the optical signal beam has a photon energy in the range from 10 eV to greater than 100 eV;
      wherein the optical signal beam has a photon energy in the range from 10 eV to greater than 200 eV;
  wherein the step of suppressing at least a portion of the residual optical excitation beam via the MCP further comprises diffracting the optical excitation beam as it propagates through the MCP.

An embodiment of the invention is a method for generating an extremely broad bandwidth XUV and/or soft x-ray (SXR) spectra signal beam characterized by a photon energy equal to or greater than 10 eV using an IR spectrum (0.4 to 5 $\mu$m) laser excitation beam. The method involves the steps of using a MCP in a co-propagation path of a residual one of the laser excitation beam and the generated XUV and/or SXR signal beam to effectively suppress the residual laser excitation beam and transmit the generated XUV and/or SXR signal beam, wherein the laser excitation beam has a pulse energy equal to or greater than 10 millijoules (mJ) and the generated XUV and/or SXR signal beam has a photon energy in the range from 10 eV to greater than 100 eV. The embodied method may be characterized by the following illustrative, exemplary, non-limiting aspects or steps:
  wherein the generated XUV and/or SXR signal beam has a photon energy in the range from 10 eV to greater than 200 eV;
  wherein the target is one of a gaseous, a liquid, and a solid target material;
  comprising generating the signal beam via High Harmonic Generation (HHG) in the target.

An embodiment of the invention is an optical system for generating attosecond XUV and/or SXR signal beam pulses. The optical system includes a signal-excitation source providing an excitation beam; a target region disposed in an optical path of the excitation beam wherein a target would be located, wherein upon irradiation of the target by the excitation beam a XUV and/or a SXR signal beam is generated, further wherein a residual excitation beam and the generated XUV and/or the SXR signal beam propagate over a co-propagation path, wherein the laser excitation beam has a pulse energy equal to or greater than 10 millijoules (mJ) and the generated XUV and/or SXR signal beam has a photon energy equal to or greater than 10 electron volts (eV); and a Microchannel Plate (MCP) disposed in the co-propagation path, wherein the MCP suppresses at least a greater portion of the residual excitation beam and transmits at least a greater portion of the XUV and/or the SXR signal beam. The embodied system may be characterized by the following illustrative, exemplary, non-limiting limitations or characteristics:

wherein the generated XUV and/or SXR signal beam has a photon energy equal to or greater than 100 eV;
wherein the generated XUV and/or SXR signal beam has a photon energy equal to or greater than 200 eV;
wherein the target is one of a gaseous, a liquid, and a solid target material;
wherein the signal beam is generated via High Harmonic Generation (HHG) in the target;
comprising a plurality of MCPs immediately inter-adjacent;
wherein the signal-excitation source is a source that provides femtosecond laser pulses each having an energy equal to or greater than 10 millijoules (mJ) and an excitation beam wavelength, $\lambda_p$, in the range between about 400 nanometers (nm) to 5 micrometers (µm);
wherein the MCP is a commercially available MCP;
wherein the MCP is a short-pass filter having a wavelength transmission cut-off that is determined by a given diameter of each of a plurality of microchannels in the MCP.

Additional features and advantages of the invention will be set forth in the detailed description to follow, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which:

FIG. 3(a): The diffracted pattern after a Ti-Sapphire laser propagates through the MCP. The center bright spot circled by the black line indicates the zero-order transmission. Higher transmission orders are spatially separated so they can be easily blocked; (b) Image of HHG generated from Argon gas on a phosphor screen after propagating through the MCP. It can be seen that harmonics with longer wavelengths are more diffracted than that of shorter wavelengths, according to an illustrative aspect of the invention;

DETAILED DESCRIPTION OF NON-LIMITING, EXEMPLARY EMBODIMENTS OF THE INVENTION

An exemplary embodiment of the invention is the use of a Microchannel Plate (MCP) as a beam separator. It can effectively block both IR and Mid-IR pump beam and transmit an unlimited range of XUV.

Since the first demonstration of isolated attosecond pulses from high-order harmonic generation (HHG) in 2001, the evolution of time-resolved research of ultrafast phenomena into the attosecond domain has already had a major impact on our understanding of electronic processes in atoms, molecules, and condensed matter. The frequency of the photons in such attosecond pulses covers the extreme-ultraviolet (XUV) and soft x-ray (SXR) spectral regions. As the photon energy varies from several electron volts (eV) in the XUV band to over 1 keV in the SXR band, depending on the generation conditions, the corresponding wavelength decreases from about 100 nm to 1.2 nm or even shorter. In order to generate such pulses, an intense femtosecond laser is usually employed as the pump laser or pump beam, which consists of optical pulses in the visible and infrared bands with wavelengths ranging from about 400 nm to five micrometers (µm), currently available from chirped pulse amplification (CPA) and optical parametric amplification (OPA). As the pump laser is focused onto a suitable gaseous sample, XUV photons with frequencies as integer multiples of the fundamental frequency can be generated by the non-linear response of the gas atoms. Suitable liquid and solid targets may also be used. Current state-of-art pump lasers include Ti:Sapphire CPA laser systems with a central wavelength in the near-infrared (NIR) band near 800 nm. Such a system can produce laser pulses with a few hundred millijoule energy and 15 femtosecond (fs) duration at the same time. Likewise, the OPA or OPCPA (Optical Parameter Chirped Pulse Amplification) techniques can provide multi-millijoule, few cycle laser pulses with a central wavelength at 1 to 3 micrometers. Such infrared (IR) systems are also common pump lasers in HHG.

Usually, the energy conversion efficiency of HHG is only one to ten parts per million, and the residual pump laser propagates coaxially with the attosecond XUV pulses. Therefore, it is a practical requirement to block the residual pump laser before the XUV pulses are delivered to the next part of the experiment. This is a major technical challenge, especially in high flux HHG systems where high-power pump laser is employed.

Figure 1:
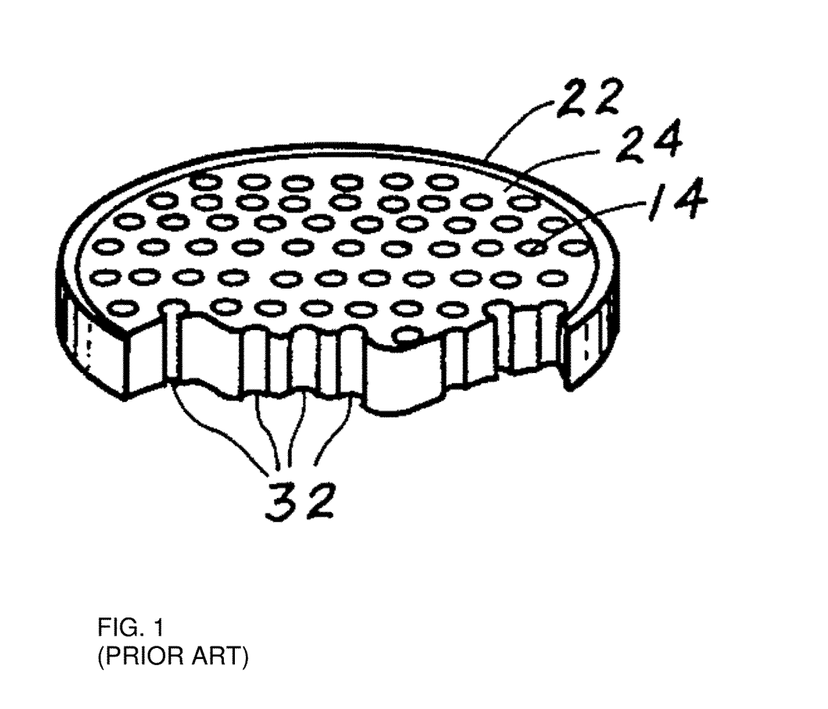
FIG. 1 is a schematic, broken, perspective, cross sectional view of a generic microchannel plate as known in the art.
Figure 2:
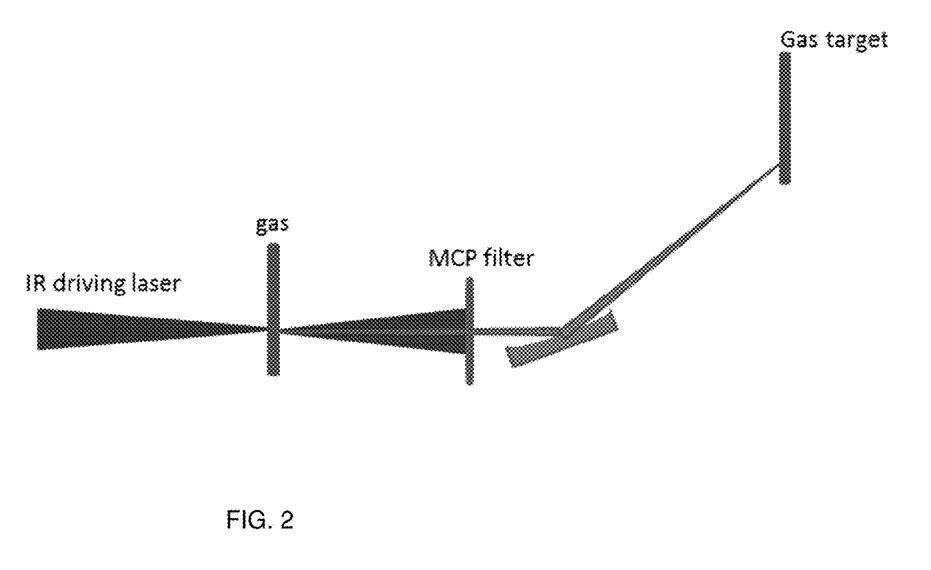
FIG. 2 is a schematic of an optical system according to an exemplary, non-limiting embodiment of the invention.

In the embodied invention, a microchannel plate (MCP) is utilized as a universal XUV filter, allowing the XUV beam to pass through with a high transmission and blocking a substantial portion of the NIR or IR pump beam. A MCP is usually used for detection of particles (electrons or ions) and impinging radiation (ultraviolet radiation and X-rays). It is typically a slab fabricated from resistive material such as glass with a dense array of tiny tubes (microchannels) leading from one surface to the other (e.g., FIG. 1). One MCP plate is usually about several hundreds of micrometers thick but two or three MCP plates can be assembled together for increasing particle detection efficiency and output signal. The microchannels are typically 5 to 25 micrometers in diameter and separated by approximately 1.2 times this diameter; they are parallel to each other and often enter the plate at a small angle (e.g., 6-8 degrees) relative to the normal of the surface. In a non-limiting aspect, a MCP that enabled easy installment and high separation efficiency had a pore channel diameter of 2 micrometer, a large aspect ratio (e.g., 80:1), and a zero degree bias angle. The distance or the position of the MCP from the XUV generation location can be flexible depending on the setup. For example, the MCP can be disposed before (FIG. 2) or after the focusing toroidal mirror. The distance can be tens of millimeters to meters long, based on what is needed.

The MCP transmission of a laser can be approximated by a single mode fiber, $T=Exp(-aL)$, where T is the transmission, a the transmission coefficient, and L the length of the fiber or thickness of the MCP. The transmission coefficient is proportional to the square of wavelength, and inversely proportional to the cube of the fiber or channel diameter. As the channel diameter of an MCP (~10 micrometers) is comparable to the pump beam wavelength (~1 micrometer), the diffraction loss for the pump beam propagating through an MCP is significant. At the same time, since the XUV beam has much shorter wavelength than the NIR or IR pump beam, the transmission of XUV is much higher. Therefore, an MCP can effectively block the pump beam.

The inventors' experimental data show that the zero-order transmissions are 0.4%, 5%, and 10% for pump lasers with 1.5, 0.8, and 0.53 micrometer wavelength respectively. For an XUV beam with wavelength below 100 nm, the zero-order transmission can be higher than 25%. It is due to its much shorter wavelength that the XUV beam suffers much less diffraction loss than the wavelength of the pump laser. Advantageously, the embodied invention provides the only way known by the inventors to separate XUV from 10 eV to above 200 eV and the residual pump laser beam with tens or hundreds of millijoule pulse energy, in HHG.

Example

The inventors demonstrated a simple scheme of using a Microchannel Plate (MCP) as a beam separator. It can effectively block both IR and Mid-IR pump beam and transmit an unlimited range of XUV. The MCP thus functions as a filter for XUV, which is particularly suitable for generating extreme broad bandwidth spectra with intense Mid-IR pump laser irradiation.

Figure 3:
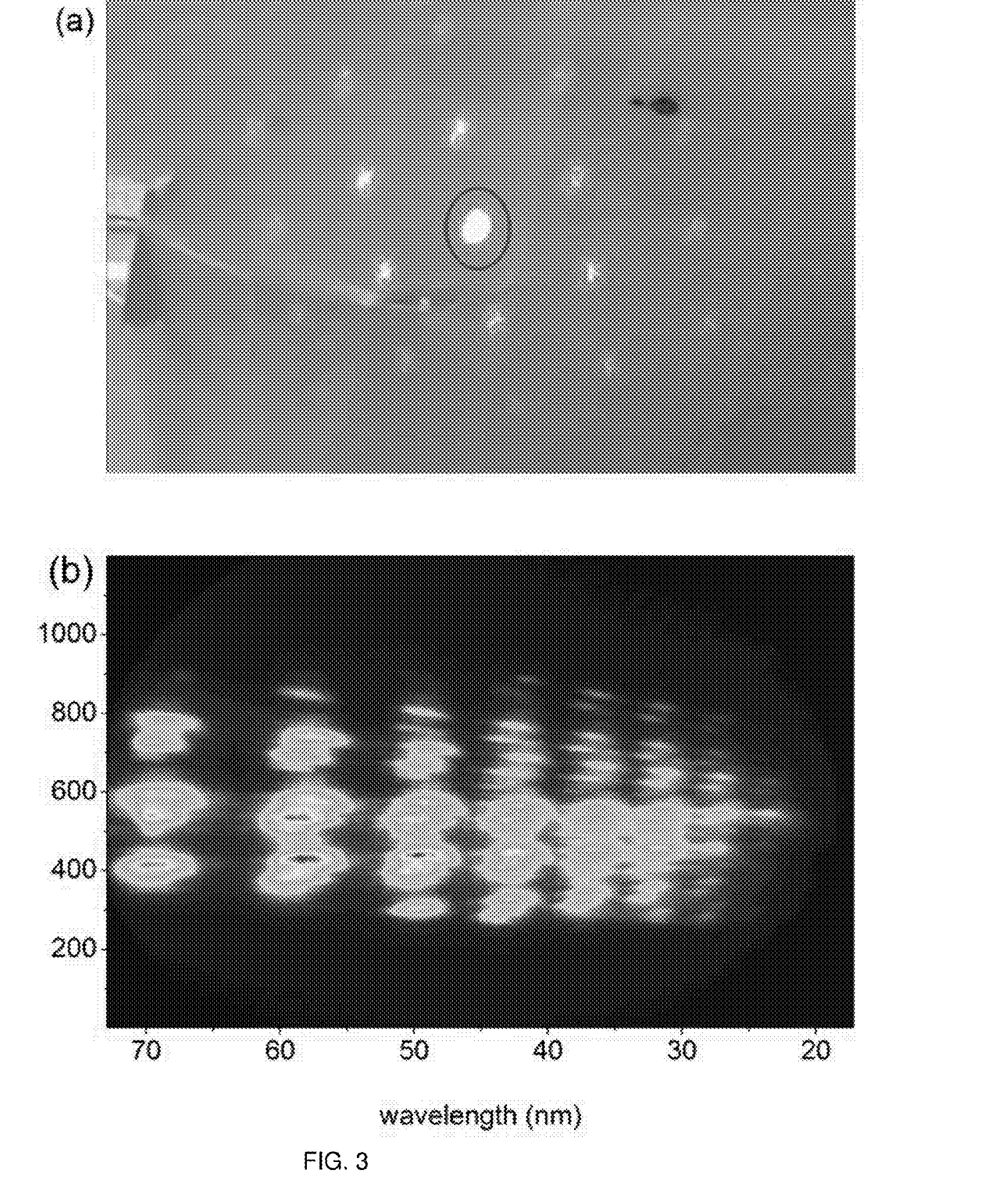

A schematic diffraction pattern of the pump laser beam propagating through a MCP is shown in FIG. 3 (*a*). The bright center spot is the zero-order transmission and follows the same path as the incident beam. As shown in FIG. 3 (*b*) and FIG. 2, the zero-order (the middle line) and two first-order transmissions of XUV generated from HHG after propagating through a MCP are focused by a grating onto an imaging MCP phosphor. It can be seen that the harmonics with longer wavelengths are more diffracted than that with shorter wavelengths.

In the diffraction pattern after the MCP, the distance between each adjacent order and the pattern shape will depend on the structure of the specific MCP. The MCP used in the experiments was commercially available from TecTra GmbH and had a pore channel diameter of 8 um and a thickness to diameter ratio (L/D ratio) of 40:1. The opening area ratio is 58% to 60%, limiting the maximum value of the transmission.

The measured MCP transmission of the XUV has been reported to be as high as 60% for energy from 50 eV to 1.5 keV. It is reasonable to assume the transmission should be the same for higher energies due to their even shorter wavelengths; however, the reported measurement was done by placing a XUV photodiode one millimeter (mm) away from the MCP, indicating the total transmission power was measured. Instead, only zero-order transmission should be used for studying ultrafast dynamics.

Figure 4:
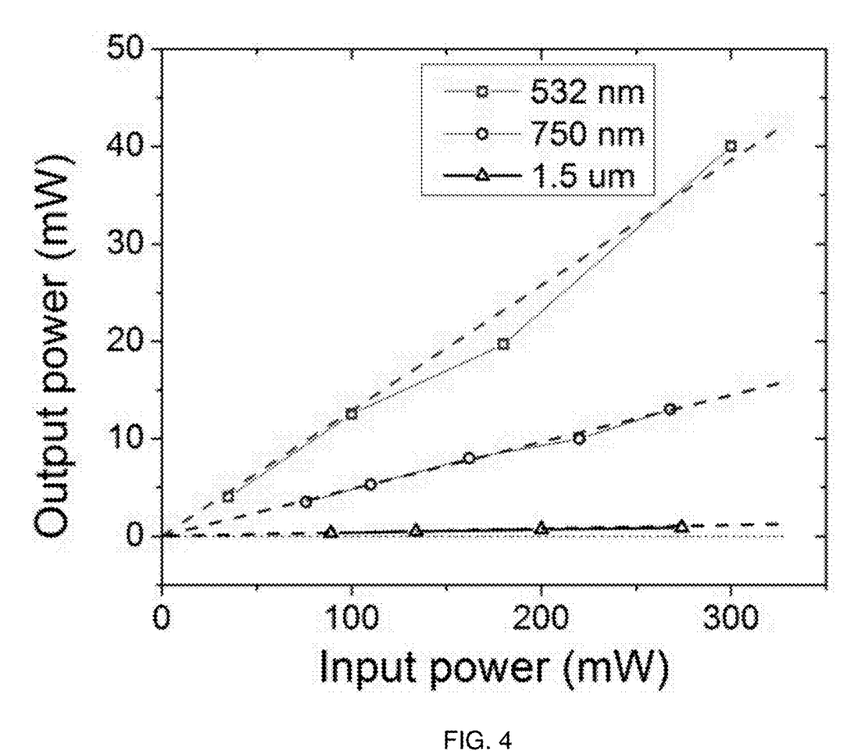
FIG. 4: The measured output power of the zero-order transmission as a function of the input laser power with different wavelengths. The dashed lines are the linear fittings to the measured data, according to an illustrative aspect of the invention.

Experimentally, the non-zero order diffractions can be blocked by a small pinhole at a certain distance from the MCP. As shown in FIG. 4, the output power of zero-order transmission for three different wavelengths is plotted as a function of input power. The solid lines are measured results, while the dash lines show the linear fitting for each wavelength. A home-built Ti-Sapphire laser provided 23 femtosecond (fs) (commonly used as the driving pulse for HHG) pulses having a central wavelength of 750 nm. Pulses of 50 fs with the central wavelength of 1.5 um were provided by an ultrafast Mid-IR laser from a commercial TOPAS (Coherent, HE-TOPAS-Prime). This laser is capable of generating a broadband continuum spectra supporting extremely short attosecond pulse from HHG due to the cutoff extension from the longer wavelength. The 532 nm laser (Changchun Dragon Lasers Co, ltd.) was a continuous laser with a maximum output energy of 300 mW. Our measurements show that the zero-order transmission is largely dependent on the wavelength of the incident beam, from the lowest transmission of 0.4% for 1.5 um to 11% for 532 nm wavelength. Particularly for the Ti-Sapphire laser, which is used for HHG in our setup, the transmission was about 5%, enough for effectively separating the XUV and IR.

Figure 5:
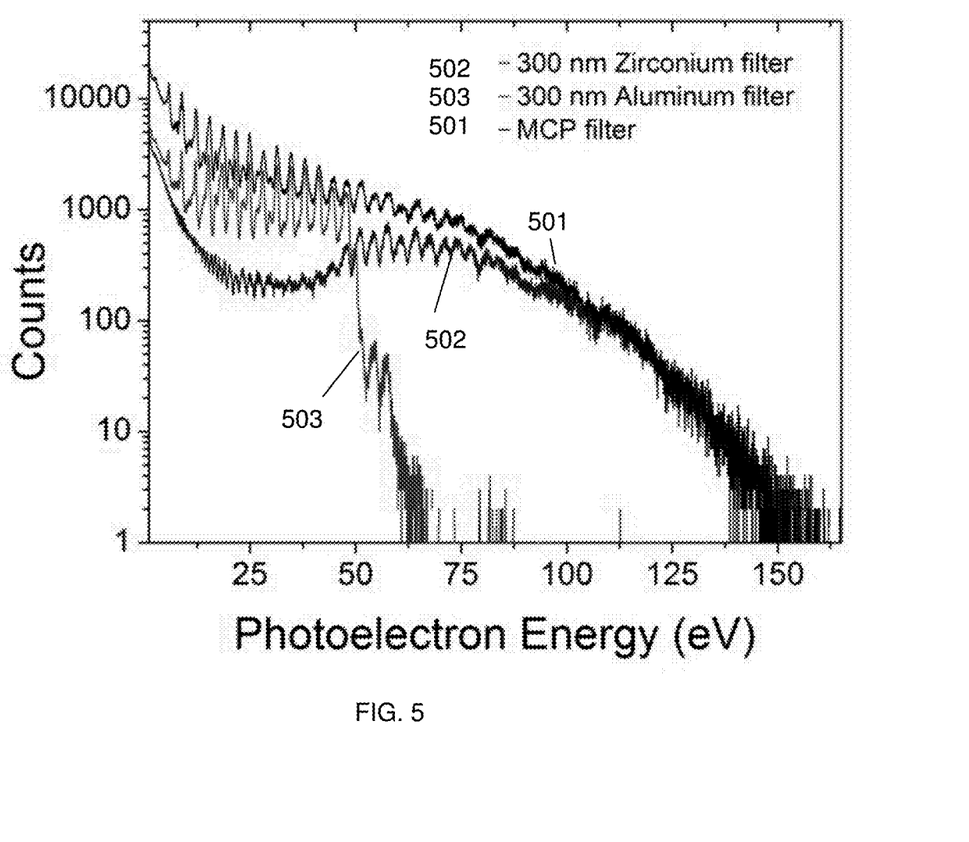
FIG. 5: Measured photoelectron spectrum taken with MCP, Al, and Zr filters separately. The line 501 is spectrum taken with MCP filter, the line 502 is Zr filter spectrum, and the line 503 is the Al filter spectrum. It can be seen that the MCP spectrum agrees well with the spectrum taken with Al and Zr filter, demonstrating that a MCP can work as an effective filter for HHG, according to an illustrative aspect of the invention.

To demonstrate this technique, a photoelectron spectrum of HHG with the MCP as a filter is shown in FIG. 5. A 7 fs, 0.5 millijoule laser was tightly focused on a Neon gas target. The XUV from the HHG was focused by a toroidal mirror onto another gas target for photoelectron generation (see FIG. 2). The energy spectrum was recorded by a Magnetic Bottle Electron Energy Spectrometer (MBEES). For comparison, photoelectron spectra taken with 300 nm Aluminum (Al) and 300 nm Zirconium (Zr) filters are also plotted. The result shows that a HHG spectrum up to 150 eV can be observed with the MCP filter and agrees quite well with the spectra taken with Al and Zr filter. The energy of the pump laser after passing through the MCP is less than 1 microjoule and therefore doesn't affect the HHG photoelectron spectrum.

Figure 6:
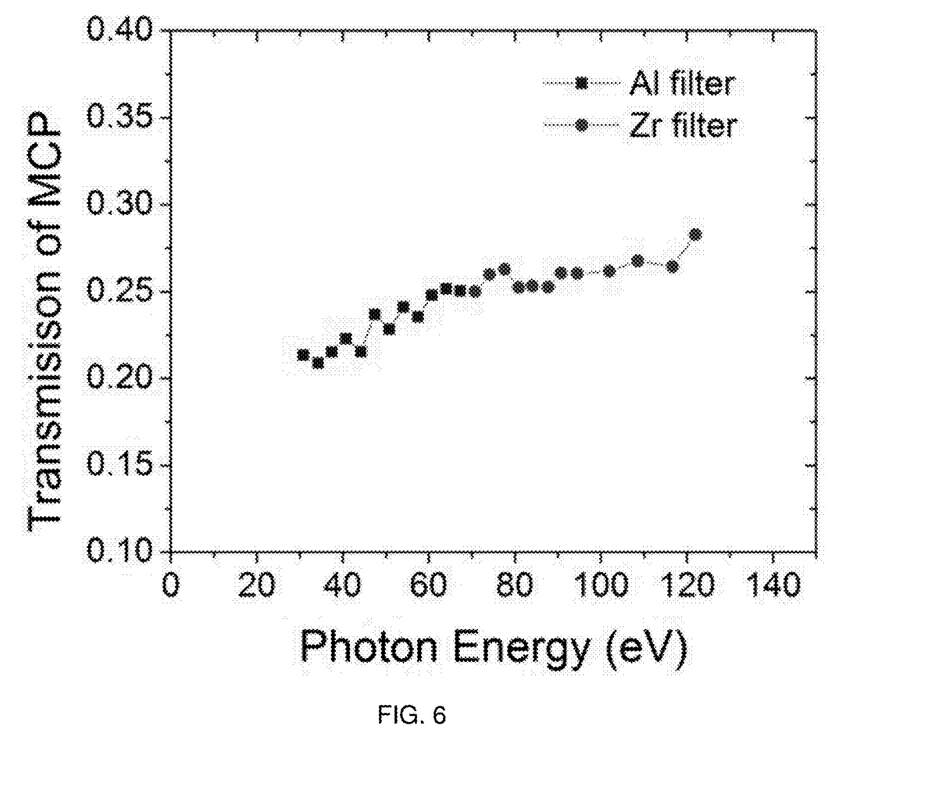
FIG. 6: The zero-order transmission of XUV through the MCP calculated from measuring photoelectron spectrum with and without MCP filter with Al (square) and Zr (circle) filter. The tendency of increasing transmission for larger photon energy can be seen clearly, according to an illustrative aspect of the invention.

The exact zero-order transmission of XUV through the MCP can be measured by comparing the HHG photoelectron spectra with and without the MCP filter. The Al and Zr thin film filters were used to select different energy ranges. The calculated transmission is plotted in FIG. 6. The square indicia curve represents the transmission taken with the Al filter and the round indicia curve shows the result calculated with the Zr filter. This measurement shows that the zero-order transmission is about 25% for the energy range measured. There is a clear tendency that the transmission is larger for higher photon energy due to the shorter wavelength.

Our experiments demonstrated that a MCP can be used as an effective beam separator for IR and XUV due to the wavelength dependent diffraction efficiency. The zero-order transmission for various wavelengths were measured and about 25% of transmission was obtained for XUV between 20 eV to 120 eV photon energy. A MCP with larger open area ratio and smaller pore size may be used to improve the zero-order transmission and better block the pump. Any apparatus with similar structure to the MCP could be used as the filter. Comparing with other known techniques, the embodied method is much easier to apply and also can transmit the broadest bandwidth of the XUV. Moreover, it is especially usefully for Mid-IR pump laser, which is the future for generating even shorter attosecond pulses. Due to the zero-order transmission, no spatial or temporal chirp will be introduced to the XUV. Therefore, combining with the attosecond streaking technique, it is feasible to directly measure the phase of each harmonic from HHG, which achievement has not yet been reported by any other technique.

In summary, a MCP is used as an optical filter to separate two wavelengths. The longer one, which can be on the same order of the channel diameter (~1 to 10 um for current commercial MCPs) or longer and essentially has no upper limit, will be suppressed or blocked due to the diffraction by the channel lattice of the MCP. The shorter one, which should advantageously be at least about one order of magnitude smaller than the channel diameter to avoid significant diffraction (~100 nm or smaller, and essentially no lower limit), will be transmitted. In pure optical terms, the MCP functions as a short-pass filter. Significantly, however, the separation of the long and short wavelengths is not realized by a coating on a substrate, as with most common short-pass filters, but rather is realized by the diffraction from the channels. The edge of the filter (the long wavelength end of the transmission spectrum) is determined by the diameter of the channels, and can be changed with different channel diameters.

The advantages of such a filter are: (1) the short-pass or long-block has no limit—any wavelength shorter than the edge will transmit, and the shorter the more; any wavelength longer than the edge will be blocked, the longer the more. Most (if not all) optical short-pass filters are not true short-pass filters, they typically just have a relatively broad transmission window on the short wavelength side. If the wavelength gets too short, it will not pass any more; (2) there is no dispersion. Usually the optical filter is realized by multilayer coatings, which would introduce different delays for different wavelengths passing through the coating. Typically, this effect will elongate the pulse length. Therefore, by not introducing any extra dispersion, the MCP is extremely useful to keep the pulse length in ultrafast pulse generation and applications, especially for attosecond pulses; (3) There is no substrate required for the embodied MCP filters. This significantly reduces the complexity of designing and making a filter, especially in the XUV/X-ray range, because a substrate will change the transmission and dispersion of the filter, sometimes greatly.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A method for optical filtering, comprising:
   providing a suitable target;
   irradiating the target with an optical excitation beam of wavelength $\lambda_p$, wherein a residual optical excitation beam after irradiation of the target has a propagation path optically downstream of the target after said irradiation;
   generating a signal beam of wavelength $\lambda_s$ by the step of irradiating the target with the optical excitation beam, wherein the signal beam has a propagation path optically downstream of the target, further wherein the residual optical excitation beam propagation path and the signal beam propagation path are co-propagating paths over a given distance;
   providing a Microchannel Plate (MCP) in the co-propagating optical paths and suppressing at least a portion of the residual optical excitation beam via the MCP while transmitting the optical signal beam through the MCP.

2. The method of claim 1, wherein the target is one of a gaseous, a liquid, and a solid target material.

3. The method of claim 1, comprising generating the signal beam via High Harmonic Generation (HHG) in the target.

4. The method of claim 1, wherein the optical excitation beam wavelength, $\lambda_p$, is in the range between about 400 nanometers (nm) to 5 micrometers (μm) and has a pulse energy equal to or greater than 10 millijoules (mJ).

5. The method of claim 1, wherein the optical excitation beam comprises femtosecond (fs) laser pulses.

6. The method of claim 1, wherein the optical signal beam wavelength, $\lambda_s$, is in the extreme ultraviolet (XUV) and/or the soft x-ray (SXR) spectra, and is characterized by a photon energy equal to or greater than 10 eV.

7. The method of claim 6, wherein the optical signal beam has a photon energy in the range from 10 eV to 100 eV.

8. The method of claim 7, wherein the optical signal beam has a photon energy in the range from 10 eV to 200 eV.

9. The method of claim 1, wherein the step of suppressing at least a portion of the residual optical excitation beam via the MCP further comprises diffracting the optical excitation beam as it propagates through the MCP.

10. A method for generating an extremely broad bandwidth XUV and/or soft x-ray (SXR) spectra signal beam characterized by a photon energy equal to or greater than 10 eV using an IR spectrum (0.4 to 5 μm) laser excitation beam, comprising:
    using a MCP in a co-propagation path of a residual one of the laser excitation beam and the generated XUV and/or SXR signal beam to effectively suppress the residual laser excitation beam and transmit the generated XUV and/or SXR signal beam, wherein the laser excitation beam has a pulse energy equal to or greater than 10 millijoules (mJ) and the generated XUV and/or SXR signal beam has a photon energy in the range from 10 eV to 100 eV.

11. The method of claim 10, wherein the generated XUV and/or SXR signal beam has a photon energy in the range from 10 eV to 200 eV.

12. The method of claim 10, wherein a target is one of a gaseous, a liquid, and a solid target material.

13. The method of claim 10, comprising generating the signal beam via High Harmonic Generation (HHG) in a target.

14. An optical system for generating attosecond XUV and/or SXR signal beam pulses, comprising:
 a signal-excitation source providing an excitation beam;
 a target region disposed in an optical path of the excitation beam wherein a target would be located, wherein upon irradiation of the target by the excitation beam a XUV and/or a SXR signal beam is generated, further wherein a residual excitation beam and the generated XUV and/or the SXR signal beam propagate over a co-propagation path, wherein a laser excitation beam has a pulse energy equal to or greater than 10 millijoules (mJ) and the generated XUV and/or SXR signal beam has a photon energy equal to or greater than 10 electron volts (eV); and
 a Microchannel Plate (MCP) disposed in the co-propagation path, wherein the MCP suppresses at least a greater portion of the residual excitation beam and transmits at least a greater portion of the XUV and/or the SXR signal beam.

15. The optical system of claim 14, wherein the generated XUV and/or SXR signal beam has a photon energy equal to or greater than 100 eV.

16. The optical system of claim 15, wherein the generated XUV and/or SXR signal beam has a photon energy equal to or greater than 200 eV.

17. The optical system of claim 14, wherein the target is one of a gaseous, a liquid, and a solid target material.

18. The optical system of claim 14, wherein the signal beam is generated via High Harmonic Generation (HHG) in the target.

19. The optical system of claim 14, comprising a plurality of MCPs immediately inter-adjacent.

20. The optical system of claim 14, wherein the signal-excitation source is a source that provides femtosecond laser pulses each having an energy equal to or greater than 10 millijoules (mJ) and an excitation beam wavelength, $\mu_p$, is in the range between about 400 nanometers (nm) to 5 micrometers (μm).

21. The optical system of claim 14, wherein the MCP is a commercially available MCP.

22. The optical system of claim 14, wherein the MCP is a short-pass filter having a wavelength transmission cut-off that is determined by a given diameter of each of a plurality of microchannels in the MCP.

23. A method for optical filtering, comprising:
 co-propagating two optical beams of wavelengths $\lambda_1$, $\lambda_2$, respectively, wherein $\lambda_2 < \lambda_1$;
 providing a MCP in a path of the co-propagating optical beams, wherein the MPC comprises a plurality of apertures each having a diameter greater than $\lambda_2$; and
 transmitting a greater portion of the $\lambda_2$ beam than a portion of the $\lambda_1$ beam through the MCP.

24. The method of claim 23, wherein $\lambda_1$ is in the range from about 400 nanometers (nm) to 5 micrometers (μm) and has a pulse energy equal to or greater than 10 millijoules (mJ), and the $\lambda_2$ beam is in the XUV and/or the SXR spectra and has a photon energy equal to or greater than 10 electron volts (eV).

25. The method of claim 23, wherein a generated XUV and/or SXR signal beam has a photon energy equal to or greater than 100 eV.

26. The optical system of claim 25, wherein the generated XUV and/or SXR signal beam has a photon energy equal to or greater than 200 eV.

27. The method of claim 23, wherein each of the plurality of apertures has a diameter equal to or greater than $10\lambda_2$.

28. The method of claim 23, wherein each of the plurality of apertures has a diameter equal to or less than $\lambda_1$.

29. The method of claim 23, further comprising establishing a wavelength transmission cut-off of the MCP by a given diameter of each of a plurality of microchannels in the MCP.

* * * * *